Oct. 9, 1934.  L. H. REED  1,976,038
TIRE COVER AND LOCK
Filed Aug. 18, 1930  2 Sheets-Sheet 1
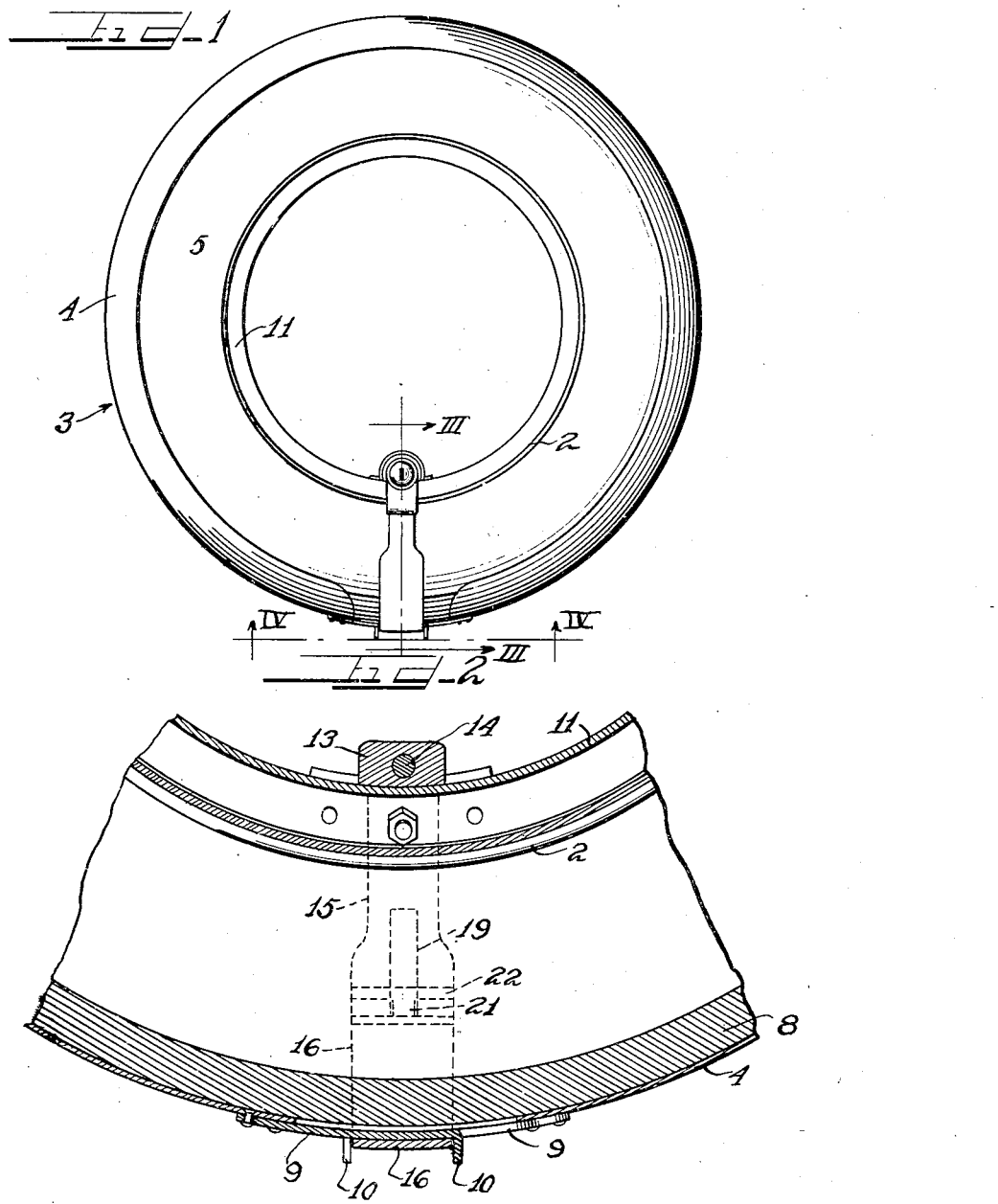
Inventor
Leon H. Reed Oct. 9, 1934.  L. H. REED  1,976,038
TIRE COVER AND LOCK
Filed Aug. 18, 1930  2 Sheets-Sheet 2
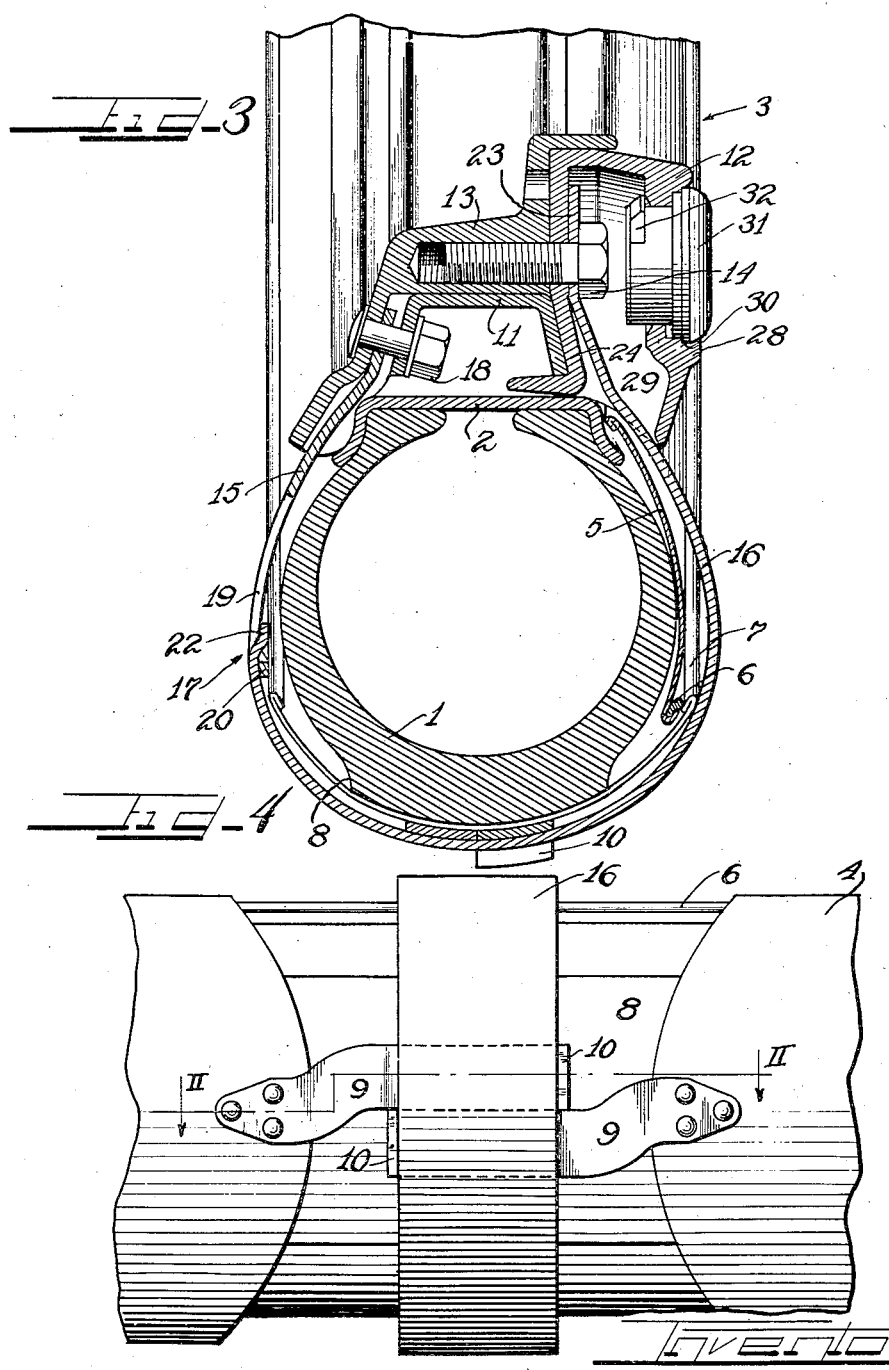
Inventor
Leon H. Reed Patented Oct. 9, 1934

1,976,038

UNITED STATES PATENT OFFICE 1,976,038

TIRE COVER AND LOCK

Leon H. Reed, Detroit, Mich., assignor to Lyon Cover Company, Detroit, Mich., a corporation of Michigan Application August 18, 1930, Serial No. 476,199

5 Claims. (Cl. 150—54)

This invention has to do with locking devices and contemplates as its essential object the provision of means for locking a spare wheel, tire mounted on the wheel, and a cover on the tire, against unauthorized removal from a car. A further object, which is embodied in that just noted, manifests itself in a means for locking a tire cover on a tire.

I realize that attempts have been made in the past to lock a wheel and tire cover to a carrier. These have enjoyed an indifferent amount of success, due to a substantial extent to the complexity of the means employed. My invention, on the other hand, has a great deal of merit by reason of its extreme simplicity and in having the advantages of ease of assembly and disassembly. Moreover, its constituent parts are easy and cheap of manufacture and the whole has a very presentable appearance. A further object in favor of my construction lies in the simplicity of the cover itself.

The type of cover intended to be locked by my invention is one including a member adapted to partially encircle the tread of a tire. The ends of the member are relatively movable, and the locking device is provided with means adapted to limit separation of said ends and thereby prevent removal of the cover from the tire. This member may, therefore, be of a resilient nature serving to maintain itself in tight engagement with the tire, or of the articulated type and may or may not be accompanied by a substantially annular side plate engageable with the side wall of the tire.

Further objects will appear as the description proceeds.

As shown on the drawings:

In the accompanying drawings, Figure 1 is a front elevation of my invention;

Figure 2 is an enlarged sectional detail view taken approximately in the plane represented by line II—II in Figure 4;

Figure 3 is an enlarged sectional detail view taken approximately in the plane indicated by the line III—III in Figure 1;

Figure 4 is an enlarged bottom view taken as shown by the line IV—IV in Figure 1.

Referring now more particularly to the drawings, wherein like reference characters designate corresponding parts, numeral 1 indicates a tire mounted on a rim 2.

Numeral 3 indicates, generally, a tire cover comprising a resilient incomplete ring member 4 and an annular side plate 5, said side plate having secured thereto an annular rubber bead 6 engageable by the adjacent portion 7 of the ring member 4. The ring member 4, by reason of its resilience, tightly grips the tread 8 of the tire 1 and also the rubber bead 6, thereby maintaining itself and the plate 5 securely upon the tire and preventing rattling of the parts.

The ring member 4 has secured to its ends, by rivets or other suitable means, offset straps or bars 9 adapted to be disposed alongside each other and to be overlapped as shown, when the cover is on the tire. The free ends of the bars 9 are provided with laterally projecting lugs 10, the purpose of which will appear as the description proceeds. A tire carrier in the form of a ring 11 fits within and adjacent the rim 2 and is adapted for permanent attachment to an automobile. For the purpose of locking the rim, tire and cover against removal from the carrier 11, I provide instrumentalities including relatively movable clamp members 12 and 13 connected by a bolt 14 inserted in engagement with the member 13, as is disclosed in Patent No. 1,656,253, to Weaver et al. Cooperating with the clamp means just noted is a strap formed of two separable parts 15 and 16, interlocked at 17. One end of the part 15 may be permanently or otherwise suitably secured to the carrier 11 and the clamp member 13 as shown at 18, the opposite end being longitudinally slotted at 19. Said opposite end has an offset extremity 20 displaced therefrom by substantially its own thickness. The adjacent end of the strap 16 is T-shaped with its neck narrow enough to rotate in the slot 19. The length of the head 22 is such as to allow the head to pass easily into the slot 19, and said head is offset as shown in Figure 3.

It will be apparent that by tilting the part 16 until it is substantially perpendicular to the part 15 at 17, and rotating the part 16 through about 90°, the head 22 may be removed from the slot 19. Reversal of these movements will make for locking the parts as shown in the drawings.

The part 16 is provided with a perforated upstanding portion 23 disposed intermediate the head of the bolt 14 and the boss 24 of the member 12. The part 16 is adapted for disposition between the lugs 10 and serves to hold said lugs in separated relation. It is thus apparent that so long as the part 16 is maintained in the position shown, it is impossible to remove the tire cover from the tire and/or to remove the complete assembly from the carrier 11.

To prevent unauthorized removal of the tire, it is necessary to prevent access to the bolt 14, since by rotating said bolt the members 12 and 13 can be entirely separated and the strap part 16 released. To this end the clamp member 12 is provided with a front wall 28 and side walls 29, the bottoms of the walls being so disposed normally as to prevent access of a wrench or like tool to the head of the bolt 14. The front wall 28 is provided with an opening 30 to receive a lock face 31 of well known construction, having spring pressed plungers 32 which normally project beyond the confines of the lock face 31 as clearly shown in Figure 3. The plungers 32 are engageable with the rear face of the front wall 28 and thereby prevent withdrawal of the lock face 31. The lock face can be removed from its position only by the application of the proper key. So long as the lock face 31 is in the position shown, access to the bolt 14 cannot be gained and consequently the cover, tire and rim are therefore rendered theftproof. When it is desired to remove the cover or tire or both, it is merely necessary to insert the proper key to remove the lock face 31, and then apply a socket wrench to the bolt 14 until the latter is out of engagement with the clamp member 13, or until the lugs 10 are no longer confined by the part 16.

As illustrated, the strap part 16 is in tight engagement with the bars 9 and will prevent rattling, the parts being adjusted for a small tire and cover. If desired, sufficient space could be provided in order that this same device may be used with tires and covers of different sizes. It will be noted further that the locking means set forth in no way detracts from the appearance of the tire cover.

The foregoing description deals primarily with a tire carrier of the ring type. I wish it to be clearly understood, however, that my invention may be modified to adapt itself to any type of carrier and any type of wheel. In other words, my invention concerns, primarily, the locking of the tire, cover and wheel against theft, and the interlocking arrangement of the tire cover ring 4 and the strap part or shoe member 16, and various means may be employed in connection therewith for maintaining the member 16 against unauthorized removal.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. A tire cover comprising a channel shaped member in the form of a split ring adapted for engagement with the tread of a tire, and having its ends in spaced relation, bars attached centrally to said ends and extending side by side, said bars having laterally extending lugs at their free ends, and means to encircle the tire and disposed between said lugs, said means holding said bars in proximity to the tread of the tire, whereby the lugs are maintained in separated relation.

2. In a tire cover, a side portion to cover the side wall of a tire and an open ended tread covering portion extending from said side portion across the tread of the tire, said tread covering portion comprising a resilient split ring expansible to be fitted over the tread of the tire and inherently contractible upon the tire to hold the portions in engagement with the tire, the ends of said ring extending side by side and having at their extremities lugs, and theftproof means disposed between said lugs to prevent unauthorized removal of the cover from a tire.

3. A multi-part tire cover for protecting a spare tire, said cover including a part for covering a side of the tire and a split arcuate rim part formed to extend about more than one-half of the periphery of the tire and cooperate with the first part to hold the same in proper protecting position, the ends of said rim part including straps extending side by side and having lugs at their free extremities, and theftproof means interlocked with said lugs to prevent unauthorized removal of the cover from a tire.

4. A tire cover for use with a tire carrier on which a spare tire is mounted, said cover being engageable with the tread of the spare tire and comprising a split ring having lugs at its ends, said lugs being spaced from each other in excess of 360°, measured along the cover, and means for maintaining said lugs in spaced relation to prevent removal of the cover from the tire, said means when in operative position encircling the carrier and tire to also prevent removal of the tire from the carrier.

5. A split tire cover for use with a tire carrier on which a spare tire is mounted, said cover having spaced lugs adjacent its ends, said lugs being spaced from each other in excess of 360°, measured along the cover, a member extending across said ends and between said lugs for holding them apart, means for securing one end of said member in stationary and the other end of said member in detachable and adjustable relation to the carrier, and a theftproof device for preventing unauthorized detachment of said other end of the member from the carrier.

LEON H. REED.